J. RAUGSTAD.
MAIL BAG CATCHER.
APPLICATION FILED SEPT. 19, 1908. RENEWED NOV. 4, 1909.
958,537.
Patented May 17, 1910.
2 SHEETS—SHEET 1.
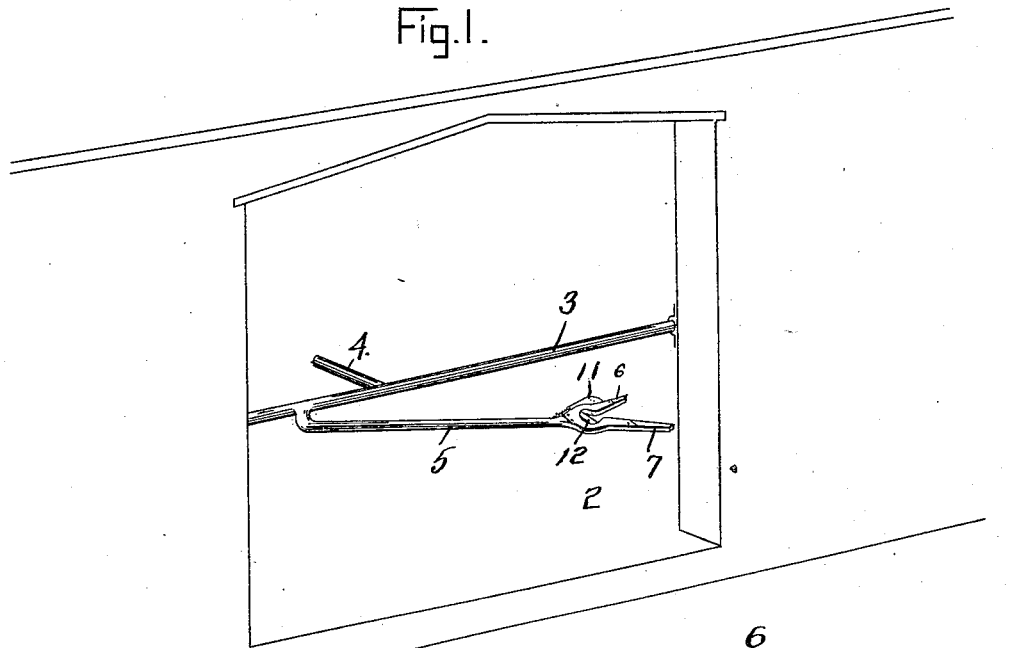
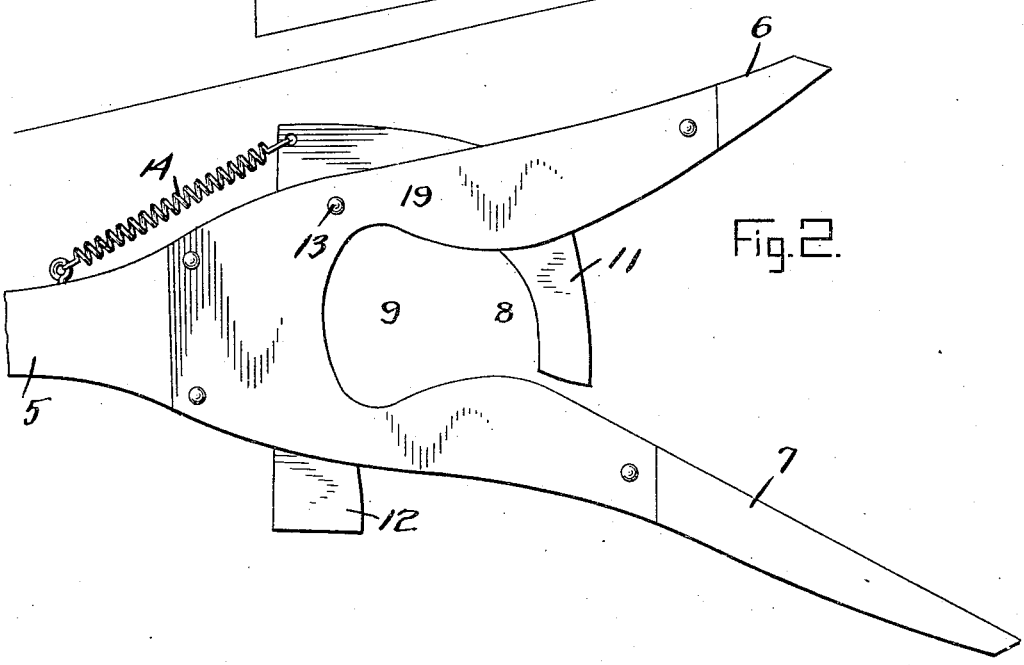
Witnesses
C. K. Reichenbach
H. McCartney
Inventor
John Raugstad
By
Attorneys

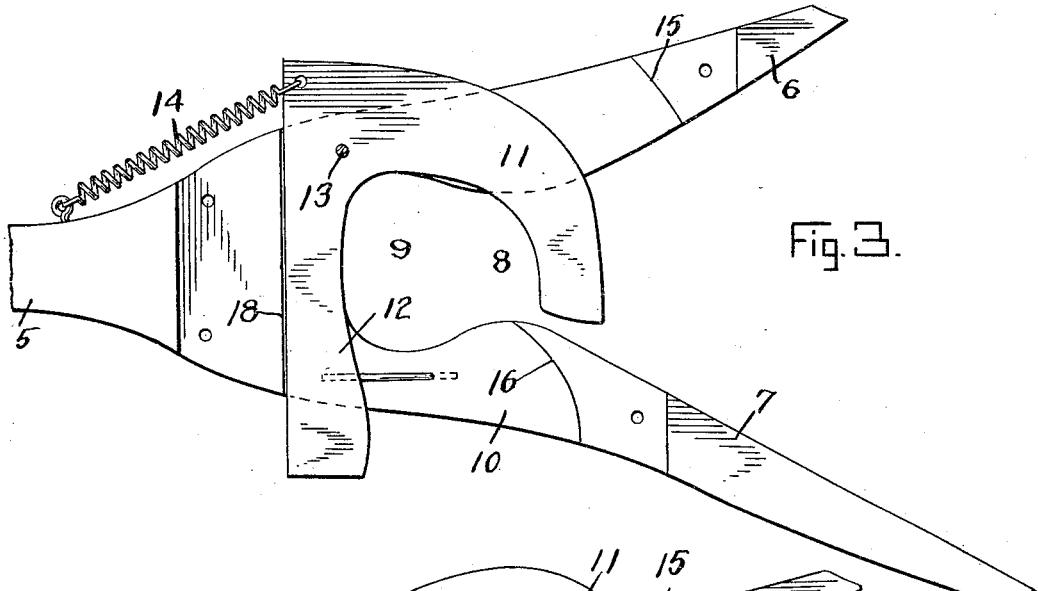
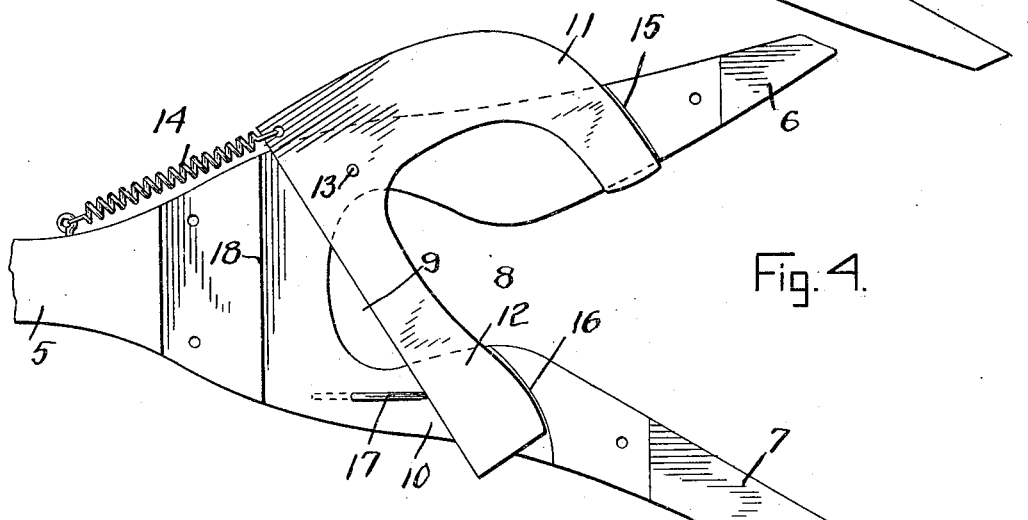
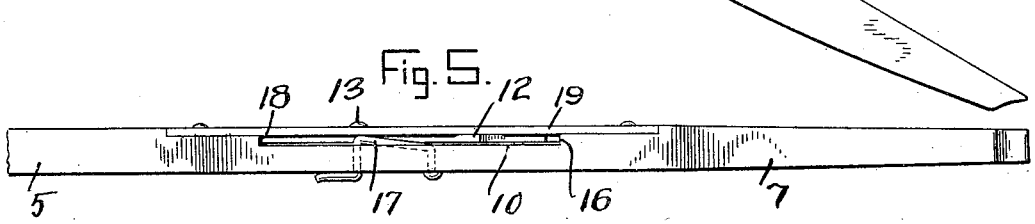

UNITED STATES PATENT OFFICE.

JOHN RAUGSTAD, OF GRASSRANGE, MONTANA.

MAIL-BAG CATCHER.

958,537. Specification of Letters Patent. Patented May 17, 1910.

Application filed September 19, 1908, Serial No. 453,787. Renewed November 4, 1909. Serial No. 526,296.

*To all whom it may concern:*

Be it known that I, JOHN RAUGSTAD, a citizen of the United States, residing at Grassrange, in the county of Fergus, State of Montana, have invented certain new and useful Improvements in Mail-Bag Catchers; and I do hereby declare the following to be a full, clear, and exact description of the invention, such as will enable others skilled in the art to which it appertains to make and use the same.

The present invention relates to improvements in mail-bag catchers, and it has for its principal object the production of an exceedingly simple and efficient catching mechanism including an automatically-operated locking lever adapted to hold a mail-bag delivered to the catcher against removal therefrom.

To this end, the catcher, briefly described, comprises a metal bar formed at its forward end with a pair of diverging arms, to the inner of which is pivoted an angular locking lever, one arm of the lever extending across the space between the catcher arms in position to receive thereagainst the impact of the transferred mail-bag, the impetus of the blow being sufficient to swing the lever upon its pivot and cause its other arm to lock the mail-bag against displacement from between the catcher arms.

The preferred embodiment of the invention is illustrated in the accompanying drawings, in which corresponding parts are designated by the same reference numerals throughout the several views.

Of the said drawings, Figure 1 is a perspective view of the complete invention, the catcher and its lever being shown in operative position. Fig. 2 is an enlarged detail plan view of the head of the catcher, the lever being shown in its inoperative position. Fig. 3 is a similar view with the cover plate removed, to illustrate the spring catch. Fig. 4 is a view similar to Fig. 3, the lever being shown in its operative position. Fig. 5 is a fragmental edge view of the outer arm of the catcher.

Referring more particularly to the drawings, 1 designates, generally, the mail-car, 2 the door opening formed in one of the sides thereof, and 3 the transversely-disposed shaft, whose ends are journaled in bracket bearings secured to the side walls of the door opening, said shaft being rotated by means of the handle 4 with which it is provided. To this shaft is secured the rear end of a metal bar 5, which extends forwardly at an angle to the shaft and is movable through the door opening into and out of operative position. At its front end, the bar is flattened and widened transversely and is formed with a pair of diverging arms 6 and 7 which occupy a common plane, the outer arm having a greater length than the inner arm. These arms are likewise widened toward their rear ends, this construction resulting in the formation of a constricted mouth 8 which leads to the seat 9, formed between the extreme rear ends of the arms.

The flattened forward end of the bar has a portion of its upper face cut away to provide a seat 10 in which the angular locking lever, hereinafter described, works, the seat being continued forwardly along the upper faces of the arms 6 and 7, which latter form a catcher proper or catcher head, as will be understood.

The lever above referred to, comprises two arms 11 and 12 set at an angle to each other, the arm 11 being arcuate, while the other arm 12 is straight. The lever is pivoted to the catcher head by a bolt 13, which fastens through its arm 12 and through the catcher arm 6, adjacent the rear or inner ends of said arms. In its normal or operative position, the lever has its straight arm 12 extending forwardly at an angle across the seat 9 in position to be struck by the mail-bag removed by the catcher from the mechanism (not shown) at the receiving station, said lever being held in such position by means of a retractile coil spring 14 which is secured at its forward end to the apex of the lever and at its rear end to the bar 5. In the above described position of the lever, the free outer end of its curved arm 11 contacts with a curved shoulder 15 formed at the forward end of the left hand extension of the seat 10, *i. e.*, the extension of said seat across the arm 6. In like manner, the free end of the arm 12 contacts with a V-shaped shoulder 16 formed at the end of the right hand extension of said seat, the formation of the shoulders 15 and 16 limiting the swinging movement of the lever under the tension of the spring 14. The bottom wall of the right hand seat extension has attached thereto a spring catch 17, across which the lever arm 12 rides during the actuation of the lever by the impact of the mail-bag thereagainst, as hereinafter described. This catch is formed by a single strip of wire which is disposed longitudinally of the arm 7, the bent rear end of the catch extending through the perforation formed in said arm, as shown in Fig. 5. The rear wall 18 of the seat forms a shoulder against which the arm 12 of the lever is arranged to contact when struck by the mail-bag.

In the operation of the invention, it will be apparent that when the car passes the receiving station, the catcher will remove the bag from the crane, the bag passing between the catcher arms 6 and 7 and through the mouth 8 against the forward edge of the lever arm 12. The impetus of the blow struck by the mail-bag is sufficient to swing the lever upon its pivot, the arm 12 riding across the catch 17, which latter is depressed, during the passage of said arm thereacross. The catch will move upwardly as soon as the lever arm has passed therebeyond and will thus hold the lever against return movement. Owing, however, to the arcuate formation of the arm 11, the latter will move across the mouth 8 when the lever is actuated, and thus close the entrance to the seat 9 in which the mail-bag has been received.

The spring 14 is provided not only for the purpose of holding the lever normally in operative position, but also for the purpose of absorbing the greater part of the shock incidental to the impact of the mail-bag against the lever arm 12, the tension of the spring being sufficient to prevent said arm from contacting violently with the shoulder 18.

The head of the catcher which, as stated, is formed by the arms 6 and 7, has attached thereto a cover plate 19, which is likewise formed with a pair of arms which follow the contour of the catcher arms, but terminate short of the ends thereof. The cover plate serves to hold the lever against upward movement, and also to prevent injury to the spring catch, over which latter, its left hand end extends.

What is claimed is:

1. A mail-bag catcher, comprising a bar having its front end flattened and formed with a pair of forwardly-extending diverging arms, the upper faces of said arms and of the adjacent portion of the bar having a seat formed therein; a pivoted locking lever working in said seat and arranged to be operated by the impact of a mail-bag thereagainst; means for normally holding the lever in operative position; and a plate secured to said bar and arranged to cover said seat.

2. A mail-bag catcher comprising a bar having the forward end thereof flattened and formed with a pair of diverging arms, the upper faces of said arms and of the adjacent portion of said bar having a seat formed therein; the pivoted lever working in said seat and consisting of an impact arm and a locking arm, the first-mentioned arm extending in its operative position across the space between the catcher arms, in position to be struck by a mail-bag delivered to the catcher; means for normally holding the lever in operative position; and a plate arranged to cover said seat.

3. A mail-bag catcher comprising a bar having its front end flattened and formed with a pair of forwardly-extending diverging arms, the upper faces of said arms and of the adjacent portion of said bar being formed with a seat; a pivoted lever working in said seat and consisting of a straight impact arm and an arcuate locking arm, the first mentioned arm extending in its operative position across the space between the catcher arms in position to be struck by a mail-bag delivered to the catcher; means for holding the lever normally in operative position; a spring catch located adjacent the impact arm, for holding the lever against return movement after its operation; and a plate arranged to cover said seat.

In testimony whereof, I affix my signature, in presence of two witnesses.

JOHN RAUGSTAD.

Witnesses:
CARL O. OLSEN,
CHRIST SATHER.